United States Patent
Hanson et al.

(10) Patent No.: US 6,956,711 B2
(45) Date of Patent: Oct. 18, 2005

(54) FRACTIONAL-RATE FEEDFORWARD RRO COMPENSATOR

(75) Inventors: Reed David Hanson, Chaska, MN (US); Nathaniel Boyd Wilson, Edmond, OK (US); John Christopher Morris, Eden Prairie, MN (US); Thomas Christopher Zirps, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 225 days.

(21) Appl. No.: 10/653,505

(22) Filed: Sep. 2, 2003

(65) Prior Publication Data

US 2005/0046994 A1 Mar. 3, 2005

(51) Int. Cl.[7] ............................................. G11B 5/596
(52) U.S. Cl. .................. 360/77.04; 360/77.08
(58) Field of Search ................. 360/75, 77.04, 360/77.08, 51, 77.02

(56) References Cited

U.S. PATENT DOCUMENTS

| | | | |
|---|---|---|---|
| 5,854,722 A | 12/1998 | Cunningham et al. | |
| 5,949,605 A | 9/1999 | Lee et al. | |
| 6,002,540 A | 12/1999 | Cunningham et al. | |
| 6,437,936 B1 | 8/2002 | Chen et al. | |
| 6,504,668 B1 * | 1/2003 | Takeuchi et al. | 360/77.04 |
| 2001/0043427 A1 | 11/2001 | Chen et al. | |
| 2002/0039248 A1 * | 4/2002 | Liu et al. | 360/77.04 |
| 2003/0016607 A1 | 1/2003 | Cho et al. | |
| 2003/0112544 A1 | 6/2003 | Harmer et al. | |
| 2003/0112545 A1 | 6/2003 | Hanson et al. | |
| 2003/0112546 A1 | 6/2003 | Hanson et al. | |

FOREIGN PATENT DOCUMENTS

| | | |
|---|---|---|
| EP | 0640956 B1 | 7/2000 |
| WO | WO 01/08139 A1 | 2/2001 |

* cited by examiner

*Primary Examiner*—Andrew L. Sniezek
(74) *Attorney, Agent, or Firm*—David K. Lucente; Derek J. Berger

(57) ABSTRACT

An apparatus and method of tracking repeatable runout in a disc drive servo loop is provided in which a feedforward signal having harmonic components that are updated at a sample rate that is a fraction of a servo sector sample rate is employed during track following.

20 Claims, 6 Drawing Sheets

FIG. 4

4 Harmonics - Full Rate

---------------------------- Sector j $i_{f_1}(j)$ $i_{f_2}(j)$ $i_{f_3}(j)$ $i_{f_4}(j)$ $i_{ff}(j) = i_{f_1}(j) + i_{f_2}(j) + i_{f_3}(j) + i_{f_4}(j)$ ---------------------------- Sector j + 1

$i_{f_1}(j+1)$ $i_{f_2}(j+1)$ $i_{f_3}(j+1)$ $i_{f_4}(j+1)$ $i_{ff}(j+1) = i_{f_1}(j+1) + i_{f_2}(j+1)$
$\qquad\qquad + i_{f_3}(j+1) + i_{f_4}(j+1)$ ---------------------------- Sector j + 2

$i_{f_1}(j+2)$ $i_{f_2}(j+2)$ $i_{f_3}(j+2)$ $i_{f_4}(j+2)$ $i_{ff}(j+2) = i_{f_1}(j+2) + i_{f_2}(j+2)$
$\qquad\qquad + i_{f_3}(j+2) + i_{f_4}(j+2)$ ---------------------------- Sector j + 3

$i_{f_1}(j+3)$ $i_{f_2}(j+3)$ $i_{f_3}(j+3)$ $i_{f_4}(j+3)$ $i_{ff}(j+3) = i_{f_1}(j+3) + i_{f_2}(j+3)$
$\qquad\qquad + i_{f_3}(j+3) + i_{f_4}(j+3)$

4 Harmonics - ¼ rate

---------------------------- Sector j $i_{f_1}(m)$ $i_{ff}(j) = i_{f_1}(m) + i_{f_2}(m-1)$
$\qquad\quad + i_{f_3}(m-1) + i_{f_4}(m-1)$ ---------------------------- Sector j + 1

$i_{f_2}(m)$ $i_{ff}(j+1) = i_{f_1}(m) + i_{f_2}(m)$
$\qquad\qquad + i_{f_3}(m-1) + i_{f_4}(m-1)$ ---------------------------- Sector j + 2

$i_{f_3}(m)$ $i_{ff}(j+2) = i_{f_1}(m) + i_{f_2}(m)$
$\qquad\qquad + i_{f_3}(m) + i_{f_4}(m-1)$ ---------------------------- Sector j + 3

$i_{f_4}(m)$ $i_{ff}(j+3) = i_{f_1}(m) + i_{f_2}(m)$
$\qquad\qquad + i_{f_3}(m) + i_{f_4}(m)$

FIG. 5

4 Harmonics - Full Rate

------------------------------ Sector j
Terms computed and accumulated:

$\sin(f_1 \cdot \theta_j)pes(j), \cos(f_1 \cdot \theta_j)pes(j)$
$\sin(f_2 \cdot \theta_j)pes(j), \cos(f_2 \cdot \theta_j)pes(j)$
$\sin(f_3 \cdot \theta_j)pes(j), \cos(f_3 \cdot \theta_j)pes(j)$
$\sin(f_4 \cdot \theta_j)pes(j), \cos(f_4 \cdot \theta_j)pes(j)$ ------------------------------ Sector j + 1
Terms computed and accumulated:

The above at k=j+1

------------------------------ Sector j + 2
Terms computed and accumulated:

The above at k=j+2

------------------------------ Sector j + 3
Terms computed and accumulated:

The above at k=j+3

4 Harmonics - ¼ rate

------------------------------ Sector j
Terms computed and accumulated:

$\sin(f_1 \cdot \theta_m)pes(j), \cos(f_1 \cdot \theta_m)pes(j)$

------------------------------ Sector j + 1
Terms computed and accumulated:

$\sin(f_2 \cdot \theta_m)pes(j+1), \cos(f_2 \cdot \theta_m)pes(j+1)$

------------------------------ Sector j + 2
Terms computed and accumulated:

$\sin(f_3 \cdot \theta_m)pes(j+2), \cos(f_3 \cdot \theta_m)pes(j+2)$

------------------------------ Sector j + 3
Terms computed and accumulated:

$\sin(f_4 \cdot \theta_m)pes(j+3), \cos(f_4 \cdot \theta_m)pes(j+3)$

US 6,956,711 B2

FRACTIONAL-RATE FEEDFORWARD RRO COMPENSATOR

FIELD OF THE INVENTION

The present invention relates generally to servo systems. In particular, the present invention relates to compensation for errors in servo systems in disc drives.

BACKGROUND OF THE INVENTION

Disc drives read and write information along concentric tracks formed on discs. To locate a particular track on a disc, disc drives typically use embedded servo fields on the disc. These embedded fields are utilized by a servo sub-system to position a head over a particular track. The servo fields can be written onto the disc in-situ (i.e., after the disc is mounted on the spindle motor of a disc drive) when the disc drive is manufactured and are thereafter simply read by the disc drive to determine position.

Ideally, a head following the center of a track moves along a perfectly circular path around the disc. However, various types of errors prevent heads from following this ideal path. One type of error is a written-in error that arises during creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path. Written-in errors are often referred to as repeatable run-out (RRO) errors or written-in repeatable runout (WI-RRO) errors because they cause the same errors each time the head passes along a track. In drives employing in-situ-written discs, the RRO or WI-RRO phenomenon is typically not radially-dependent, i.e., there is no definite correlation between the radial position of a track between the disc inner diameter (ID) and the disc outer diameter (OD) on the disc surface and the WI-RRO associated with the track.

To meet the demand for greater recording density, disc drives can be manufactured using discs with servo-tracks that are pre-written onto the discs before the discs are mounted on the spindle motor of the drive. When such discs with pre-written tracks (pre-written discs) are mounted and clamped on a spindle motor of a disc drive, in addition to WI-RRO errors, RRO errors also occur due to centering misalignment of the pre-written servo tracks and the center of rotation of the spindle, and further due to track distortion caused by disc clamping forces. This additional RRO induced in drives including pre-written discs has been found to be radially-dependent, i.e., it varies coherently across the surface of the disc from the OD to the inner ID, and therefore is referred to as coherent repeatable runout (CRRO).

Several of the CRRO frequency components vary with time and temperature. Feedforward compensators can adapt to changes in CRRO over temperature and time. One algorithm employed to perform this compensation is referred to as the alternating current feedforward (ACFF) algorithm. However, the ACFF algorithm is costly in terms of both computation and data memory requirements. As the tracks per inch (TPI) increase, it becomes necessary to include more frequency components in the ACFF, since variations in CRRO that were negligible in past generations become significant as the TPI increase. Additionally, as the servo sector sample rate increases from generation to generation, the amount of memory needed to implement the ACFF algorithm, which operates at the servo sector sample rate, also increases.

Embodiments of the present invention provide solutions to these and other problems, and offer other advantages over the prior art.

SUMMARY OF THE INVENTION

The present embodiments relate to disc drive servo systems that employ a fractional-rate alternating current feedforward algorithm, which carries out computations at a sample rate that is a fraction of a servo sector sample rate, thereby reducing computation and data memory requirements.

An apparatus and method of tracking repeatable runout in a disc drive servo loop is provided in which a feedforward signal having harmonic components that are updated at a sample rate that is a fraction of a servo sector sample rate is employed during track following.

Other features and benefits that characterize embodiments of the present invention will be apparent upon reading the following detailed description and review of the associated drawings.

BRIEF DESCRIPTION OF THE DRAWINGS

FIGS. 4 and 5 illustrate computations carried out for implementing full-rate and fractional-rate RRO feedforward compensation.

DETAILED DESCRIPTION OF ILLUSTRATIVE EMBODIMENTS

Figure 1:
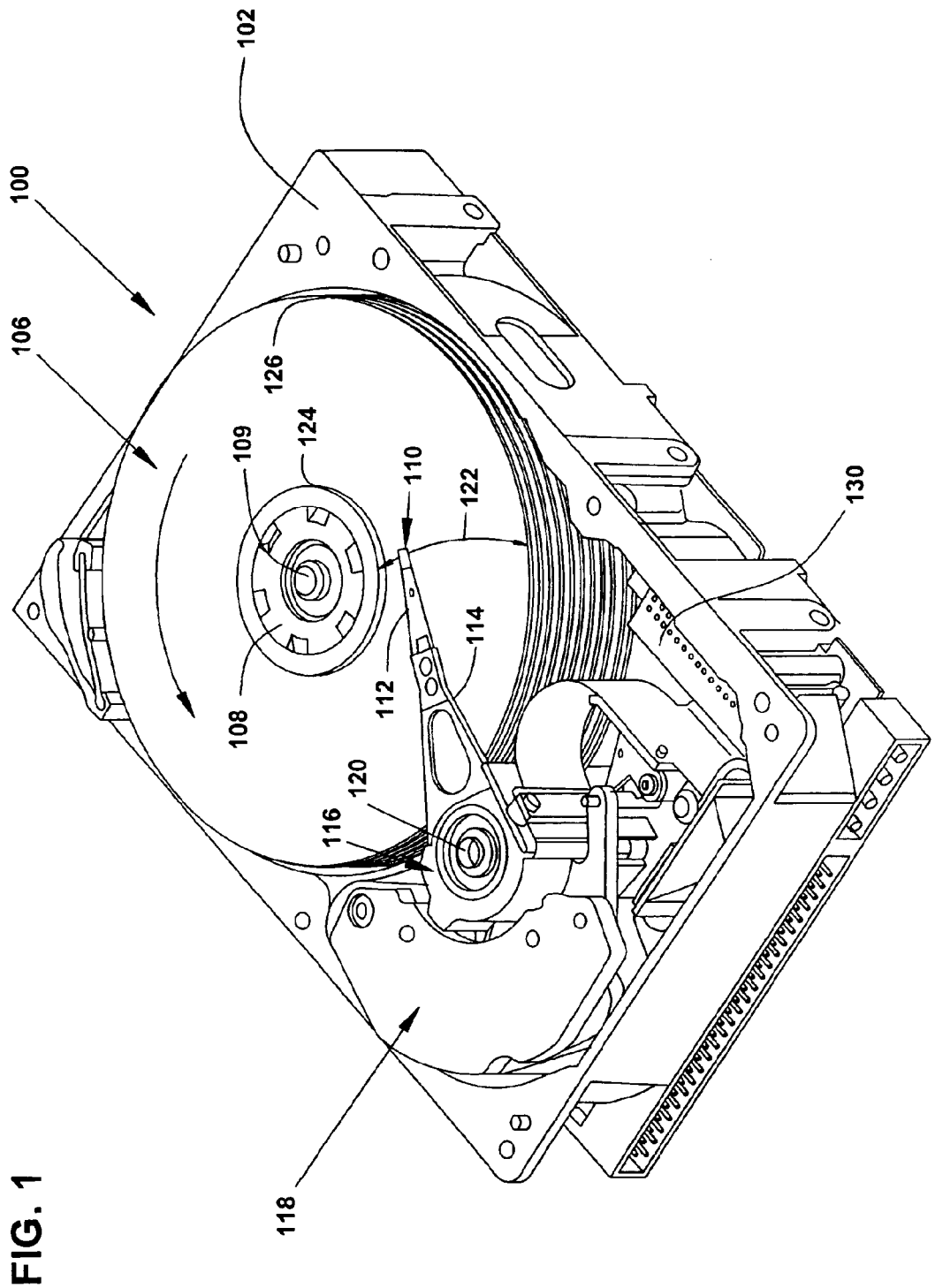
FIG. 1 is an isometric view of a disc drive.

Referring now to FIG. 1, an isometric view of a disc drive 100 in which embodiments of the present invention are useful is shown. The same reference numerals are used in various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
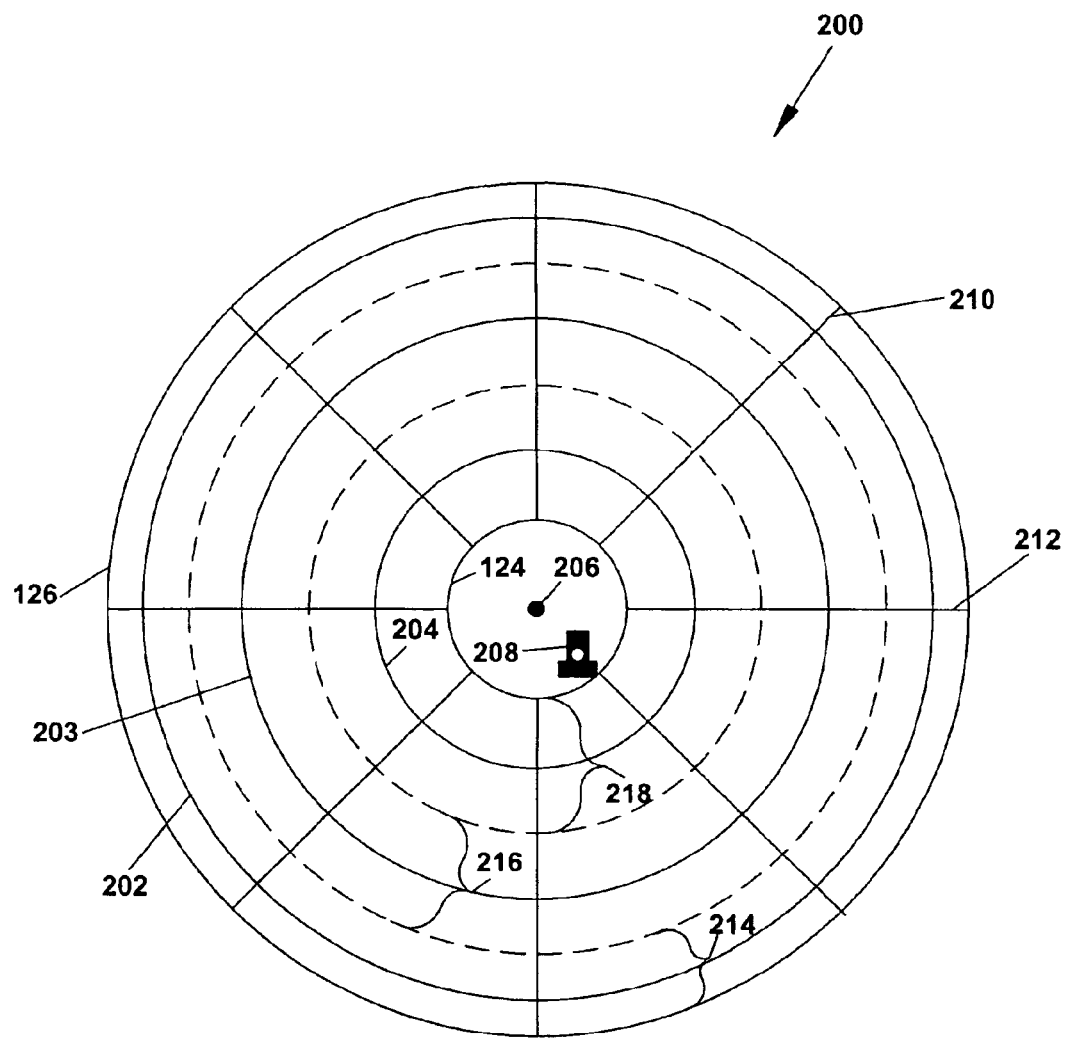
FIG. 2 is a top view of a section of a disc with pre-written servo tracks.

Referring now to FIG. 2, a top view of a section 200 of a disc, with pre-written servo-tracks such as 202, 203 and 204, which is mounted on a disc drive spindle motor having a spin-axis 208 is shown. Disc 200 includes a plurality of radially extending servo fields such as servo fields 210 and 212 which define a plurality of servo sectors. Disc 200 may also be divided into zones, with each zone including multiple tracks. In FIG. 2, three zones 214, 216 and 218 are shown. Pre-written servo tracks 202, 203 and 204 have an actual track center shown by reference numeral 206. If the track center of the disc coincides with the center of the spindle motor and if the tracks are perfectly circular, there will be no repeated position errors or repeatable runout (RRO) errors occurring each time the head passes a particular circumferential location on the disc. However, since the tracks are never perfectly circular, written-in repeatable runout (WI-RRO) always occurs in drives. Further, as can be seen in FIG. 2, in a drive with a pre-written disc such as 200, an incongruity between the track center 206 and the spindle motor spin-axis 208 typically exists. Additionally, in such drives with pre-written discs, servo-track distortion occurs when the disc is clamped onto the spindle motor. The centering misalignment of the pre-written servo tracks such as 202, 203 and 204 as well as servo track distortion due disc clamping forces contributes significantly to the RRO phenomenon. The RRO caused by centering misalignment and clamping forces has been found to be radially-dependent and thus varies coherently across the surface of the disc from the OD to the ID. This additional radially-dependent RRO is referred to as coherent repeatable runout (CRRO).

As mentioned above, alternating current feedforward (ACFF) algorithms are utilized to compensate for changes in CRRO over temperature and time. One form of ACFF algorithm to compensate for frequency components of CRRO that are either large in amplitude or vary over time and temperature is expressed as $$i_f(k) = a_f(n)\sin(f\cdot\theta_k) + b_f(n)\cos(f\cdot\theta_k) \quad \text{Equation 1}$$

where $i_f$ is the control signal used to track the $f^{th}$ harmonic, n is the index of the spindle rotation, and k is the index for the servo sector. Additionally, coefficients $a_f(n)$ and $b_f(n)$ are updated once per spindle rotation as $$a_f(n) = a_f(n-1) + g_f \sum_{k=0}^{N-1} \sin(f\cdot\theta_k) pes(k) \quad \text{Equation 2A}$$

$$b_f(n) = b_f(n-1) + g_f \sum_{k=0}^{N-1} \cos(f\cdot\theta_k) pes(k) \quad \text{Equation 2B}$$

where N is the number of servo sectors per revolution and pes(k) is the position error signal (difference between the actual head position and the desired head position) at the $k^{th}$ servo sector.

Another form of the ACFF algorithm that can be employed when the runout profile is radially-dependent can be described as $$i_f(k) = (A_f(\text{track\_id}) + a_f(n))\sin(f\cdot\theta_k) + (B_f(\text{track\_id}) + b_f(n))\cos(f\cdot\theta_k) \quad \text{Equation (3)}$$

where $A_f$ and $B_f$ represent polynomials, look-up tables or other functions that describe the radial dependence of the runout. In the above expression, the coefficients $a_f(n)$ and $b_f(n)$ are updated in the same manner as described by Equation 2 above.

As mentioned above, in Equations 1–3, n is the index of the spindle rotation and k is the index of the servo sector. Therefore, in the above Equations, it is clear that $i_f(k)$ (the control signal used to track the $f^{th}$ harmonic) is updated at every sector (k) during a spindle rotation (n). In general, the above forms of the ACFF algorithm update harmonic components of the feedforward signal at a servo sector sample rate. As mentioned above, these forms of the ACFF algorithms are costly in terms of both computation and data memory requirements.

Under the present invention, RRO (specifically CRRO) tracking in a disc drive servo loop is carried out by utilizing a feedforward signal having harmonic components that are updated at a sample rate that is a fraction of a servo sector sample rate. By operating the ACFF at a fractional-rate and distributing the calculation over multiple sectors, as described further below, there is a significant saving in terms of both computation time and data memory. It is noted that the performance, in terms of the convergence rate and the attenuation level of the CRRO, is not compromised by operating the ACFF at a fractional-rate. However, there may be an increase in the CRRO at higher frequencies caused by images in the feedforward signal that are generated by aliasing. To reduce the effects of the aliasing, an interpolation filter that reduces the amplitude of the images in the feedforward signal may be included in the servo loop.

Figure 3:
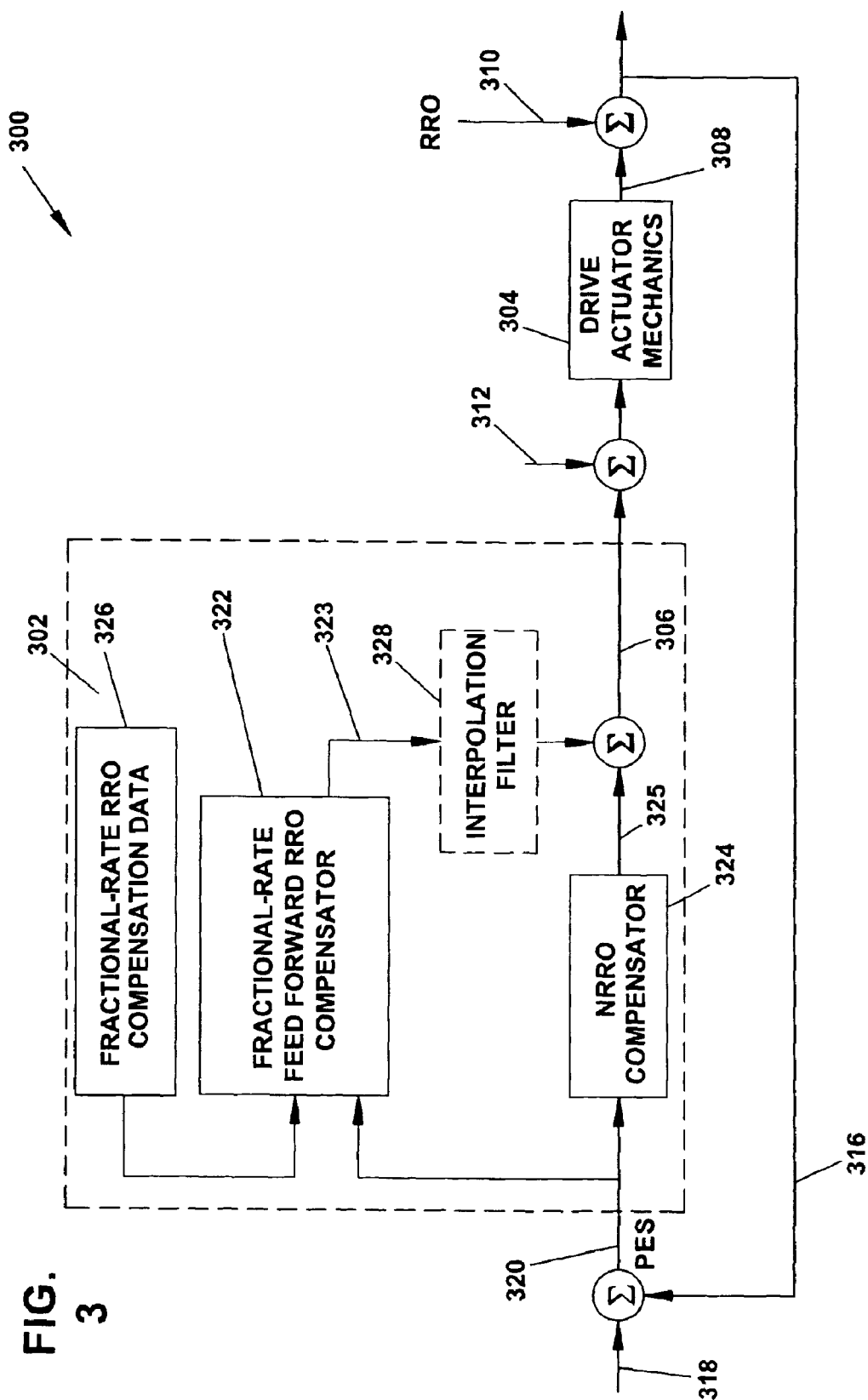
FIG. 3 is a simplified block diagram of a servo loop in accordance with an embodiment of the present invention.

Referring now to FIG. 3, a block diagram of a servo loop 300 of the present invention is shown. Servo loop 300 includes a servo controller 302 and disc drive actuator mechanics 304. Servo controller 302 is included in the servo controller circuitry within internal circuit 130 of FIG. 1. Drive actuator mechanics 304 includes actuator assembly 116, voice coil motor 118, track accessing arm 114, suspension 112 and sliders 110, all of FIG. 1.

Servo controller 302 generates a control current 306 that drives the voice coil motor of drive actuator 304. In response, the drive actuator 304 produces head motion 308. In FIG. 3-1, the RRO (combined WI-RRO and CRRO) error is represented as a separate input signal 310 even though the RRO would otherwise appear implicitly in head motion 308. The separation of RRO from head motion 308 provides a better understanding of the present invention. In addition, noise in the servo system has been separated and appears as noise 312, which is added to the control signal. The sum of head motion 308, which includes noise 312, and RRO 310 results in the head's servo measurement signal, represented by reference numeral 316. Servo measurement signal 316 is subtracted from a reference signal 318, which is generated by internal circuitry 130 based on a desired location of the head. Subtracting head measurement 316 from reference signal 318 produces a position error signal (PES), represented by reference numeral 320, which is input to servo controller 302.

PES 320 includes RRO error components and non-repeatable run-out (NRRO) error components. As mentioned above, WI-RRO is caused by imperfectly written servo-tracks and CRRO occurs due to misalignment of the track center of the disc and the spindle-axis, and due to servo track distortion caused by disc clamping forces. NRRO is caused by spindle ball bearing defects, rocking modes, disc vibration, etc.

As can be seen in FIG. 3, servo controller 302 includes a fractional-rate feedforward RRO compensator 322 and an NRRO tracking module 324. Also included in servo controller 302, is fractional-rate RRO compensation data (represented by reference numeral 326) computed for a number of sampling points that are less than the number of servo sectors. Data 326 is obtained either during factory calibration (carried out during manufacture of the disc drive), start-up calibration (carried out during initial startup of the disc drive), or from a refined calibration procedure (carried out subsequent to the initial startup of the disc drive). Data 326 may be stored in the form of a table in memory (for example, non-volatile memory) contained in servo electronics 130 (FIG. 1). Depending upon a particular track to be followed, fractional-rate feedforward compensator 322 selects suitable data values from compensation data 326 and responsively produces an RRO control signal 323 of appropriate magnitude and phase for injection into the servo loop. NRRO tracking module 324 extracts the NRRO component(s) from the PES and outputs an NRRO control signal 325. Control signals 323 and 325 are added to provide control signal 306. Interpolation filter 328 may optionally be included in servo loop 300 to reduce the effects of aliasing, which may be caused by high-frequency CRRO components. Interpolation filter 328 may be a first order hold (FOH) that is well known in the art. Example fractional-rate feed-forward algorithms that can be employed in feedforward compensator 322 are described below in connection with Equations 4–6.

As mentioned above, to reduce both the computation and memory requirements, the ACFF algorithm is operated at a fractional-rate. Operating the ACFF at a fractional-rate, can be expressed as:

$$i_f(m) = a_f(n)\sin(f \cdot \theta_m) + b_f(n)\cos(f \cdot \theta_m) \quad \text{Equation 4}$$

or in the case of the radially-dependent implementation as $$i_f(m) = (A_f(\text{track\_id}) + a_f(n))\sin(f \cdot \theta_m) + (B_f(\text{track\_id}) + b_f(n))\cos(f \cdot \theta_m) \quad \text{Equation 5}$$

where m represents the index of the fractional-rate (a fraction of the servo sector sample rate). The coefficients $a_f(n)$ and $b_f(n)$ in the above expressions are updated as:

$$a_f(n) = a_f(n-1) + g_f \sum_{m=0}^{M-1} \sin(f \cdot \theta_m) pes(m) \quad \text{Equation 6A}$$

$$b_f(n) = b_f(n-1) + g_f \sum_{m=0}^{M-1} \cos(f \cdot \theta_m) pes(m) \quad \text{Equation 6B}$$

where M is the number of sampling points per disc revolution.

The advantages of operating the ACFF algorithm at a fractional-rate can best be explained by example. Consider a situation where four frequency components of the CRRO are going to be controlled using ACFF. If the algorithm is run at full rate, Equation 1 (or Equation 3 in the case of radially-dependent runout) must be evaluated for each frequency at every servo sector. This situation is depicted in the left-hand side of FIG. 4, where $i_{f1}$, $i_{f2}$, $i_{f3}$ and $i_{f4}$ correspond to the four harmonic components and j, j+1, j+2 and j+3 are four consecutive sectors. Now consider the case that the ACFF is operated at ¼ rate (Equation 4 (or Equation 5 in the case of radially-dependent runout)). In this case, the computation for the each frequency can be distributed over the sectors as shown in the right hand side of FIG. 4. Note for the case of operating ACFF at full rate, Equation 1 must be evaluated four times at each sector. In the case of operating at a ¼ rate, Equation 4 (the fractional-rate equivalent of Equation 1) needs to be evaluated only once per sector. This represents a portion of the computational savings. The other portion is gained by distributing the computation of Equation 6 in a similar fashion as illustrated in FIG. 5. Note that by doing so, this also represents a four-fold reduction in the amount of computation required to evaluate the ACFF.

By operating the ACFF at a fractional-rate, less memory is also required. It is noted that the sin( ) and cos( ) functions (fractional-rate RRO compensation data 326 (FIG. 3)) are not evaluated in real-time but are evaluated off-line from a calibration procedure (such as factory calibration, start-up calibration or refined calibration), and the results are stored in a table herein referred to as the sine table. The sine table is then used when making the real-time calculations involving the sin( ) and cos( ) functions. The size of the sine table depends on the implementation. For a full rate system, the size of the sine table can range from 0.25N to 1.25 N, where N is the number of sectors per revolution. There is a tradeoff in that a shorter sine table requires more computation to determine the indexes into the sine table. For the ACFF operating at a fractional-rate, the size of the table reduces to 0.25M to 1.25M where M is the period of the fractional-rate. The same tradeoff applies in determining the index into the sine table for the fraction-rate implementation. Therefore, by operating the ACFF algorithm at a fractional-rate, a significant reduction in the size of the sine table is possible without an increase in computation. For the example given above (and shown in FIG. 5), the sine table would be ¼ of the length of the table used in the full rate implementation.

The above examples are solely for illustration purposes. In practice, the exact setup of the fractional-rate ACFF will depend upon the product. The setup will depend on the number of harmonics being controlled, the frequencies of the harmonics being controlled, and the integral divisors of the sample rate. For example, a product that has six harmonics that need to be controlled using ACFF could have various fractional-rate implementations. One possibility would be to operate at ⅙-rate in a manner that parallels the previous example, i.e., computing one harmonic per sector. Another possibility would be to operate at ½ rate and compute 3 harmonics per cycle. The second case represents a 50% reduction in the computation, whereas the first case represents an 83% reduction. The setup of the fractional-rate ACFF varies from product to product, but the utilization of a fractional-rate ACFF will represent a significant computational savings in general.

In model disc drives including the fractional-rate feedforward RRO compensation scheme, it was found that the performance, in terms of the convergence rate and the attenuation level of the CRRO, is not compromised by operating the ACFF at a fractional-rate.

As noted above, there may be an increase in CRRO at higher frequencies caused by images in the feedforward signal that are generated by aliasing. To reduce the effects of the aliasing, embodiments of the present invention employ an interpolation filter (such as 328 of FIG. 3) to reduce the amplitude of the images in the feedforward signal. The benefits of using an interpolation filter are again best explained by an example. The parameters in this example are realistic, but represent only one situation. The example considered here is for the following parameters:
1) Servo sample rate: 48 kHz (kilo Hertz)
2) ACFF fractional-rate: ¼
3) Number of ACFF harmonics compensated: 4
4) Spindle speed: 15 k rpm (rotations per minute)
5) ACFF harmonics: 1,2,3,4 (i.e., 250,500,750,1000 Hz)

Figure 6:
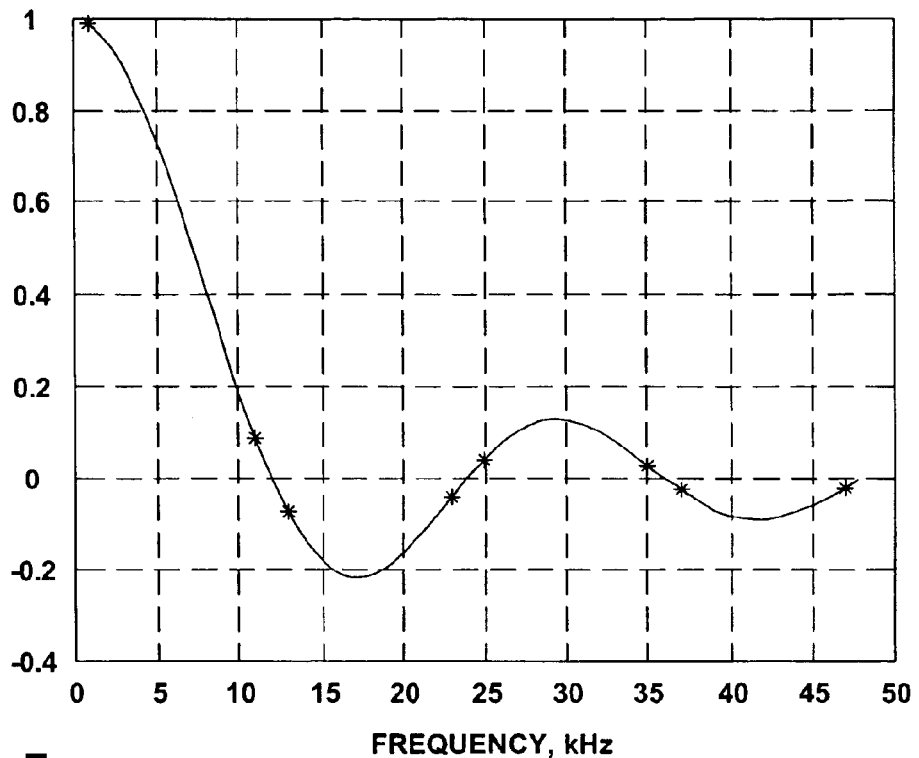
FIG. 6 is frequency response plot obtained without an interpolation filter in the servo loop.
Figure 7:
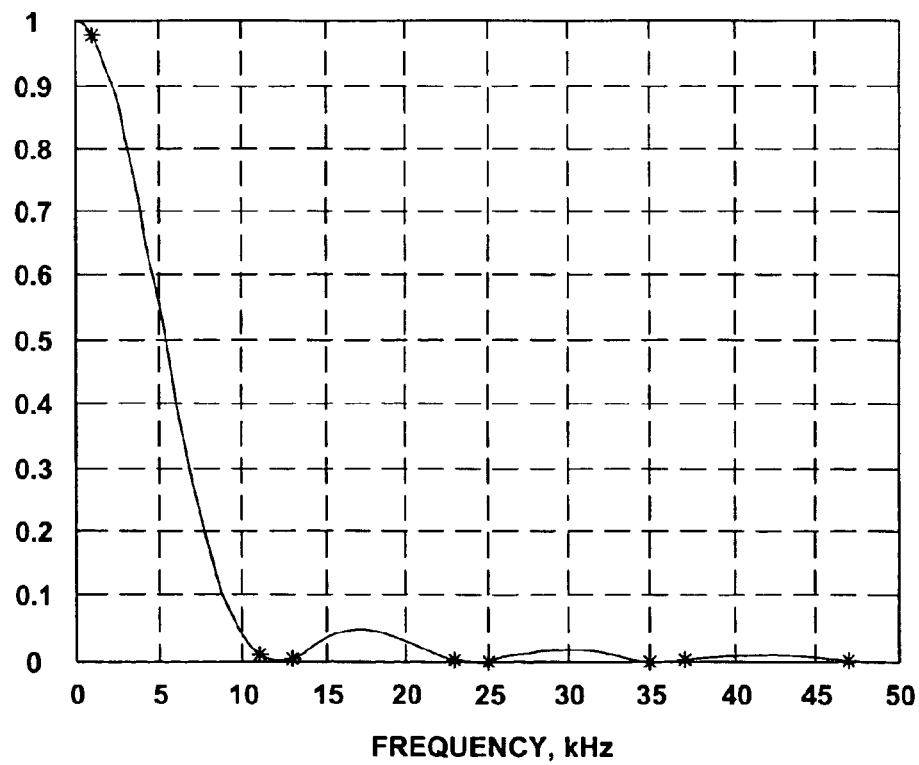
FIG. 7 is frequency response plot obtained with the use of an interpolation filter in the servo loop.

The images generated from the $4^{th}$ harmonic have the largest magnitude and therefore, for brevity, only plots for the $4^{th}$ harmonic are shown in FIGS. 6 and 7. FIG. 6 shows the images generated without interpolation. Note that the image with the largest magnitude occurs at 11 kHz, and that this image has an amplitude of approximately 0.1. FIG. 7 represents the same analysis, but now assumes that a FOH is used as an interpolation filter. Note that by using a FOH, the magnitude of the images is significantly reduced. It should be pointed out that running the ACFF at ¼-rate using a FOH still represents a significant reduction in both computation and memory compared to running the ACFF at full-rate without interpolation. Also, in this example, the compromise (i.e., the magnitude of the aliased images generated) is insignificant.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a fractional-rate RRO tracking/compensation scheme for use in a servo loop for a disc drive data storage system, it will be appreciated by those skilled in the art that the teachings of the present invention can be applied to any servo system, particularly servo systems of storage devices that employ optical media, magnetic tapes, etc., without departing from the scope and spirit of the present invention. Further, the fractional-rate RRO tracking/compensation scheme may be implemented in hardware or software. The disc drive can be based upon magnetic, optical, or other storage technologies and may or may not employ a flying slider.

What is claimed is:

1. A method of tracking repeatable runout, the method comprising:
   providing a feedforward signal for track following, the feedforward signal having harmonic components that are updated at a sample rate that is a fraction of a servo sector sample rate.

2. The method of claim 1 wherein the updating of the harmonic components is distributed over a plurality of servo sectors.

3. The method of claim 1 further comprising utilizing an interpolation filter to suppress high frequency repeatable runout components.

4. The method of claim 1 wherein the feedforward signal is determined as a function of fractional-rate RRO compensation data, which is computed for a number of sampling points that are less than a number of servo sectors.

5. The method of claim 4 further comprising storing the fractional-rate RRO compensation data prior to determining the feedforward signal as the function of the fractional-rate RRO compensation data.

6. The method of claim 4 wherein the fractional-rate RRO compensation data is determined from a calibration procedure.

7. The method of claim 6 wherein the calibration procedure is a factory calibration procedure that is carried out during manufacture of the disc drive.

8. The method of claim 6 wherein the calibration procedure is a startup calibration procedure that is carried out during initial startup of the disc drive.

9. The method of claim 6 wherein the calibration procedure is a refined calibration procedure that is carried out subsequent to initial startup of the disc drive.

10. A servo loop comprising:
    a feedforward compensator configured to provide a feedforward signal for track following, the feedforward signal having harmonic components that are updated at a sample rate that is a fraction of a servo sector sample rate.

11. The apparatus of claim 10 wherein the feedforward compensator is configured to distribute the updating of the harmonic components over a plurality of servo sectors.

12. The apparatus of claim 10 further comprising an interpolation filter configured to suppress high frequency repeatable runout components.

13. The apparatus of claim 10 wherein the feedforward compensator is configured to determine the feedforward signal as a function of fractional-rate RRO compensation data, which is computed for a number of sampling points that are less than the number of servo sectors.

14. The apparatus of claim 13 wherein the fractional-rate RRO compensation data is stored in a memory.

15. The apparatus of claim 14 wherein the memory is a non-volatile memory.

16. The apparatus of claim 13 wherein the fractional-rate RRO compensation data is determined from a calibration procedure.

17. The apparatus of claim 16 wherein the calibration procedure is a factory calibration procedure that is carried out during manufacture of the disc drive.

18. The apparatus of claim 16 wherein the calibration procedure is a startup calibration procedure that is carried out during initial startup of the disc drive.

19. The apparatus of claim 16 wherein the calibration procedure is a refined calibration procedure that is carried out subsequent to the initial startup of the disc drive.

20. A disc drive comprising:
    a disc having tracks; and
    a feedforward compensator configured to provide a feedforward signal for track following, the feedforward signal having harmonic components that are updated at a sample rate that is a fraction of a servo sector sample rate.

* * * * *